(12) United States Patent
Son et al.

(10) Patent No.: US 9,574,874 B2
(45) Date of Patent: Feb. 21, 2017

(54) SYSTEM AND METHOD FOR RECONSTRUCTING 3D MODEL

(71) Applicant: SAMSUNG ELECTRONICS CO., LTD., Suwon-si, Gyeonggi-do (KR)

(72) Inventors: Woo-ram Son, Seoul (KR); Han Oh, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 338 days.

(21) Appl. No.: 14/219,224

(22) Filed: Mar. 19, 2014

(65) Prior Publication Data

US 2015/0109415 A1    Apr. 23, 2015

(30) Foreign Application Priority Data

Oct. 17, 2013   (KR) .................. 10-2013-0124152

(51) Int. Cl.
| | |
|---|---|
| *G01B 11/22* | (2006.01) |
| *H04N 7/18* | (2006.01) |
| *H04N 5/232* | (2006.01) |
| *G06T 17/00* | (2006.01) |
| *G06T 7/00* | (2006.01) |

(52) U.S. Cl.
CPC ............. *G01B 11/22* (2013.01); *G06T 7/0065* (2013.01); *G06T 17/00* (2013.01); *H04N 5/23222* (2013.01); *H04N 7/18* (2013.01); *G06T 2207/10028* (2013.01); *G06T 2207/20016* (2013.01)

(58) Field of Classification Search
CPC ..................... G01B 11/22; G06T 17/00; G06T 2207/10028; G06T 2207/20016; G06T 7/0065; H04N 5/23222; H04N 7/18

USPC .......................................................... 348/46
See application file for complete search history.

(56) References Cited

U.S. PATENT DOCUMENTS

| | | | |
|---|---|---|---|
| 8,401,225 B2 | 3/2013 | Newcombe et al. | |
| 8,401,242 B2 | 3/2013 | Newcombe et al. | |
| 2012/0141016 A1* | 6/2012 | Wildeboer ......... | H04N 13/0271 382/154 |
| 2012/0195471 A1* | 8/2012 | Newcombe ........... | G06T 7/2006 382/106 |

(Continued)

OTHER PUBLICATIONS

Izadi et al., "KinectFusion: Real-time 3D Reconstruction and Interaction Using a Moving Depth Camera," Proceedings of the 24th Annual ACM Symposium on User Interface Software and Technology, ACM, pp. 559-568 (2011).

*Primary Examiner* — Behrooz Senfi
(74) *Attorney, Agent, or Firm* — Drinker Biddle & Reath LLP (57) ABSTRACT

A system and method for reconstructing a three-dimensional (3D) model are described. The 3D model reconstruction system includes: a low resolution reconstruction unit that converts a first depth map, acquired by scanning a scene with a depth camera, into a second depth map having a low resolution, processes the second depth map to extract pose change information about a pose change of the depth camera, and reconstructs a low resolution 3D model in real-time; and a high resolution reconstruction unit that processes the first depth map by using the pose change information of the depth camera that is extracted from the second depth map and reconstructs a high resolution 3D model.

18 Claims, 8 Drawing Sheets

(56) References Cited

U.S. PATENT DOCUMENTS

| | | | |
|---|---|---|---|
| 2013/0155058 A1* | 6/2013 | Golparvar-Fard | G06T 19/006 345/419 |
| 2015/0009214 A1* | 1/2015 | Lee | G06T 7/0046 345/420 |

* cited by examiner

SYSTEM AND METHOD FOR RECONSTRUCTING 3D MODEL

RELATED APPLICATIONS

This application claims the priority benefit under 35 U.S.C. §119(a) from Korean Patent Application No. 10-2013-0124152, filed on Oct. 17, 2013, in the Korean Intellectual Property Office, the disclosure of which is incorporated herein by reference in its entirety.

BACKGROUND

1. Field

One or more embodiments of the present disclosure relate to a system and method for reconstructing a three-dimensional (3D) model.

2. Related Art

Tracking an accurate movement of a camera from a series of photographed scenes is an area of great concern in such fields as 3D virtual reality or robotics. Among various methods of tracking movement of a camera, a technique of using distance information obtained from a depth camera provides excellent performance and is widely used in 3D scanners.

SUMMARY

One or more embodiments of the present disclosure include a method of reconstructing a three-dimensional (3D) model in an embedded system in real-time.

Additional aspects will be set forth in part in the description which follows and, in part, will be apparent from the description, or may be learned by practice of the presented embodiments.

According to one or more embodiments of the present disclosure, a system for reconstructing a 3D model includes: a low resolution reconstruction unit that converts a first depth map, acquired by scanning a scene with a depth camera, into a second depth map having a low resolution, processes the second depth map to extract pose change information about a pose change of the depth camera, and reconstructs a low resolution 3D model in real-time; and a high resolution reconstruction unit that processes the first depth map by using the pose change information of the depth camera that is extracted from the second depth map and reconstructs a high resolution 3D model.

The low resolution reconstruction unit may include: a scale adjuster that generates the second depth map by downsizing the first depth map; a first map converter that converts depth data in the second depth map into point cloud data in a coordinate system in 3D space; a first sensor tracker that matches point cloud data in the second depth map with point cloud data in a previous second depth map by using an iterative closest point (ICP) algorithm and extracts the pose change information of the depth camera based on the result of matching; and a first volume constructor that integrates together point cloud data in the second depth map and the previous second depth map and generates a low resolution 3D volume in real-time, based on the pose change information of the depth camera.

The low resolution reconstruction unit may further include a first map estimator for estimating an estimated depth map from the low resolution 3D volume.

The estimated depth map may be visualized based on a user's viewpoint, displayed, and stored as the previous second depth map.

The high resolution reconstruction unit may include: a second map converter that converts the depth data in the first depth map into point cloud data in a coordinate system in 3D space; a second sensor tracker that matches point cloud data in the first depth map with point cloud data in a previous first depth map by using an iterative closest point (ICP) algorithm and extracts the pose change information of the depth camera based on the result of matching; and a second volume constructor that integrates together point cloud data in the first depth map and the previous first depth map and generates a high resolution 3D volume, based on the pose change information of the depth camera, and wherein the second sensor tracker performs the ICP algorithm by using the pose change information of the depth camera that is extracted from the second depth map.

The high resolution reconstruction unit may further include a second map estimator for estimating an estimated depth map from the high resolution 3D volume.

The second sensor tracker may exclude overlapping depth maps by using the pose change information of the depth camera that is extracted from the second depth map and perform the ICP algorithm on each of the selected depth maps except for the overlapping depth maps.

The estimated depth map may be stored as the previous first depth map.

The high resolution reconstruction unit may receive a depth map sequence and the pose change information of the depth camera from the low resolution reconstruction unit and reconstructs a high resolution 3D model, either after the depth camera completes a scan or while the depth camera performs the scan.

The low resolution reconstruction unit may be an embedded system, and the high resolution reconstruction unit may be a cloud server. The embedded system may upload a depth map sequence and the pose change information of the depth camera to the cloud server and downloads the high resolution 3D model from the cloud server.

According to one or more embodiments of the present disclosure, a method of reconstructing a 3D model includes: converting a first depth map acquired by scanning a scene through a depth camera into a second depth map having a low resolution, processing the second depth map to extract pose change information about a pose change of the depth camera, and reconstructing a low resolution 3D model in real-time; and processing the first depth map by using the pose change information of the depth camera that is extracted from the second depth map and reconstructing a high resolution 3D model.

The reconstructing of the low resolution 3D model may include: generating the second depth map by downsizing the first depth map; converting depth data in the second depth map into point cloud data in a coordinate system in 3D space; matching point cloud data in the second depth map with point cloud data in a previous second depth map by using an ICP algorithm and extracting the pose change information of the depth camera based on the result of matching; and integrating together point cloud data in the second depth map and the previous second depth map and generating a low resolution 3D volume in real-time, based on the pose change information of the depth camera.

The reconstructing of the low resolution 3D model may further include estimating a depth map from the low resolution 3D volume.

The estimated depth map may be visualized based on a user's viewpoint, displayed, and stored as the previous second depth map.

The reconstructing of the high resolution 3D model may include: converting the depth data in the first depth map into point cloud data in a coordinate system in 3D space; matching point cloud data in the depth map with point cloud data in a previous depth map by using an ICP algorithm and extracting the pose change information of the depth camera based on the result of matching; and integrating together point cloud data in the first depth map and the previous first depth map and generating a high resolution 3D volume, based on the pose change information of the depth camera. In the extracting of the pose change information of the depth camera, the ICP algorithm may be performed by using the pose change information of the depth camera that is extracted from the second depth map.

The reconstructing of the high resolution 3D model may further include estimating an estimated depth map from the high resolution 3D volume.

The extracting of the pose change information of the depth camera may include excluding overlapping depth maps by using the pose change information of the depth camera that is extracted from the second depth map and performing the ICP algorithm on each of the selected depth maps except for the overlapping depth maps.

The estimated depth map may be stored as the previous first depth map.

The reconstructing of the high resolution 3D model may include reconstructing the high resolution 3D model by using a depth map sequence and the pose change information of the depth camera, either after the depth camera completes a scan or while the depth camera performs the scan.

The reconstructing of the low resolution 3D model may include reconstructing the low resolution 3D model in each of a plurality of embedded systems. The reconstructing of the high resolution 3D model may include reconstructing the high resolution 3D model for the scene by using the pose change information of the depth camera that is received from the embedded system by a cloud server. The method may further include each of the embedded systems downloading the high resolution 3D model from the cloud server.

The system and method for reconstructing a 3D model allow real-time tracking of a position of the depth camera even in an embedded system by using multi-resolution depth maps, thereby facilitating reconstruction of the 3D model.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Various embodiments allow for various changes and numerous embodiments, embodiments will be illustrated in the drawings and described in detail in the description. However, this is not intended to limit the present disclosure to a particular mode of practice, and it is to be appreciated that the present disclosure encompasses all changes, equivalents, and substitutes that do not depart from the spirit and technical scope thereof. In the description of the present disclosure, well-known methods will not be described in detail so as not to unnecessarily obscure the features of the present disclosure.

While the terms such as "first" and "second" may be used to describe various components, such components must not be limited to the above terms. The terms are used only to distinguish one component from another.

The terms used in the present application are merely used to describe various embodiments, and are not intended to limit the present disclosure. Use of singular forms includes plural references as well unless expressly specified otherwise. The terms "comprising", "including", and "having" specify the presence of stated features, numbers, steps, operations, elements, components, and/or a combination thereof but do not preclude the presence or addition of one or more other features, numbers, steps, operations, elements, components, and/or a combination thereof. As used herein, the term "and/or" includes any and all combinations of one or more of the associated listed items. Expressions such as "at least one of," when preceding a list of elements, modify the entire list of elements and do not modify the individual elements of the list.

Reference will now be made in detail to various embodiments, examples of which are illustrated in the accompanying drawings. In the drawings, reference numerals refer to like elements throughout, and repeated descriptions thereof are omitted here.

Figure 1:
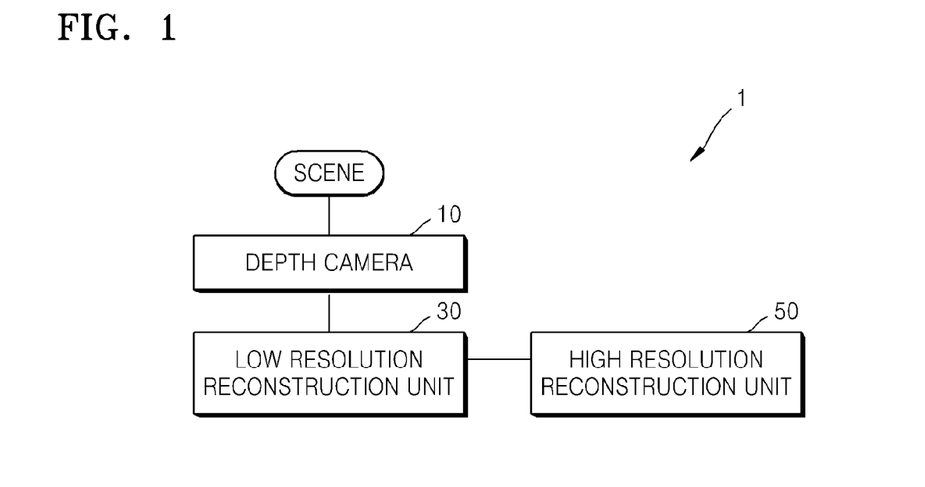
FIG. 1 is a block diagram of a system for reconstructing a three-dimensional (3D) model (hereinafter, referred to as a 3D model reconstruction system), according to an embodiment.

FIG. 1 is a block diagram of a system 1 for reconstructing a three-dimensional (3D) model (hereinafter, referred to as a "3D model reconstruction system"), according to an embodiment.

Referring to FIG. 1, the 3D model reconstruction system 1 according to the present embodiment includes a depth camera 10, a low resolution reconstruction unit 30, and a high resolution reconstruction unit 50.

The depth camera 10 is a scanning device or depth sensor designed to capture a scene or surrounding environment (space) and acquire real-time three-dimensional (3D) information of the scene including various objects (e.g., stationary objects such as walls or obstacles or dynamic objects including humans or animals).

The depth camera 10 scans the surrounding environment or scene to generate a depth map sequence (i.e., a sequence of depth maps). The depth camera 10 may create a depth map sequence at a predetermined frame rate. Each depth map in the depth map sequence is a two-dimensional (2D) image in which each pixel has depth data. The depth data is information about a distance between the depth camera 10 and each object in the captured scene. The depth data may be an absolute value expressed as a particular unit of measurement, or relative depth data. The depth camera 10 may be hand-held or worn by a user, or installed in a movable object such as a robot or vehicle to capture the surrounding environment or scene while moving.

The low resolution reconstruction unit 30 may be a device including the depth camera 10. The device may be a mobile terminal that has the depth camera 10 integrated therein, such as a notebook computer, a hand-held device, a smartphone, or a tablet, or any suitable device that uses the mobile terminal or is directly or indirectly connected thereto.

The low resolution reconstruction unit 30 receives a depth map generated each time the depth camera 10 performs a scan and processes the depth map in real-time to reconstruct a low resolution 3D model. In detail, the low resolution reconstruction unit 30 converts the depth map into a low resolution depth map, registers or matches the low resolution depth map with a previous depth map, and extracts information about a pose change of the depth camera 10 (hereinafter, referred to as pose change information of the depth camera 10). The low resolution reconstruction unit 30 aligns and integrates low resolution depth maps together and generates a low resolution 3D volume, based on the pose change information of the depth camera 10, thereby reconstructing a low resolution 3D model. The low resolution reconstruction unit 30 aligns and integrates a depth map estimated from a previously reconstructed low resolution 3D volume with a newly input low resolution depth map and reconstructs a new low resolution 3D model. The 3D model is a 3D model of various objects present in the surrounding environment or space captured by the depth camera 10. The pose change information of the depth camera 10 is displacement data for a depth map extracted as a result of registration (matching) between a pair of depth maps and represents a position and an orientation of the depth camera 10. A depth map sequence received from the depth camera 10 and the pose change information of the depth camera 10 that is extracted from each depth map may be stored in a memory.

The low resolution reconstruction unit 30 may transmit the depth map sequence and the pose change information of the depth camera 10 that is extracted from each depth map to the high resolution reconstruction unit 50, either during the depth camera 10 scans in real-time or after the depth camera 10 completes a scan.

The high resolution reconstruction unit 50 may be implemented within a device incorporating the low resolution reconstruction unit 30. Alternatively, the high resolution reconstruction unit 50 may be a device that can exchange data with the low resolution reconstruction unit 30, such as another notebook computer, hand-held device, smartphone, or tablet, a digital television, a desktop computer, or any other suitable device. The high resolution reconstruction unit 50 may also be a cloud server on the Internet.

The high resolution reconstruction unit 50 may receive a result of reconstruction of a low resolution 3D model from the low resolution reconstruction unit 30 and reconstruct a high resolution 3D model by using the received reconstruction result. The high resolution reconstruction unit 50 may receive a depth map sequence and pose change information of the depth camera 10 that is extracted from a low resolution depth map from the low resolution reconstruction unit 30. The high resolution reconstruction unit 50 also registers (matches) and integrates together selected depth maps except for overlapping depth maps by using the received pose change information of the depth camera 10 and reconstructs a high resolution 3D model.

In detail, the high resolution reconstruction unit 50 receives the depth map sequence and the pose change information of the depth camera 10 in real-time to reconstruct the high resolution 3D model together with the low resolution 3D model during reconstruction of the low resolution 3D model. Alternatively, the high resolution reconstruction unit 50 may receive the depth map sequence and the pose change information of the depth camera 10 after the depth camera 10 completes a scan to reconstruct a high resolution 3D model. The high resolution reconstruction unit 50 may store the reconstructed high resolution 3D model in the memory.

When the high resolution reconstruction unit 50 is implemented on a cloud server, the high resolution reconstruction unit 50 reconstructs a high resolution 3D model by using a depth map sequence and pose change information of the depth camera 10 uploaded by the low resolution reconstruction unit 30 and stores the high resolution 3D model. The low resolution reconstruction unit 30 may download the stored high resolution 3D model. The low resolution reconstruction unit 30 may upload the depth map sequence and the pose change information of the depth camera 10, either in real-time while reconstructing a low resolution 3D model or after completing reconstruction thereof.

The low resolution reconstruction unit 30, the high resolution reconstruction unit 50, or both, may be connected to various systems that use a 3D model, and the high resolution 3D model may be used in a wide variety of application systems that use animation movies, games, and characters.

The 3D model reconstruction system 1 according to the present embodiment is a hybrid 3D model reconstruction system that separates reconstruction of a low resolution 3D model from reconstruction of a high resolution 3D model. The reconstruction of a high resolution 3D model requires a large number of computations and a long computation time, thereby making real-time monitoring difficult. Furthermore, a high performance system is required to generate a high resolution 3D model in real-time.

The 3D model reconstruction system 1 according to the present embodiment reconstructs a low resolution 3D model in real-time by using a low resolution depth map, thereby allowing real-time monitoring. The 3D model reconstruction system 1 also reconstructs a high resolution 3D model by using a high resolution depth map and the result of reconstruction of a low resolution 3D model, thereby enabling the use for an embedded system instead of a high performance system.

Furthermore, according to the 3D reconstruction system 1, a user may monitor in real-time a reconstructed low resolution 3D model displayed on a screen of an embedded system in the form of a 2D image and gradually finish an incomplete portion thereof, thereby increasing user convenience.

Figure 2:
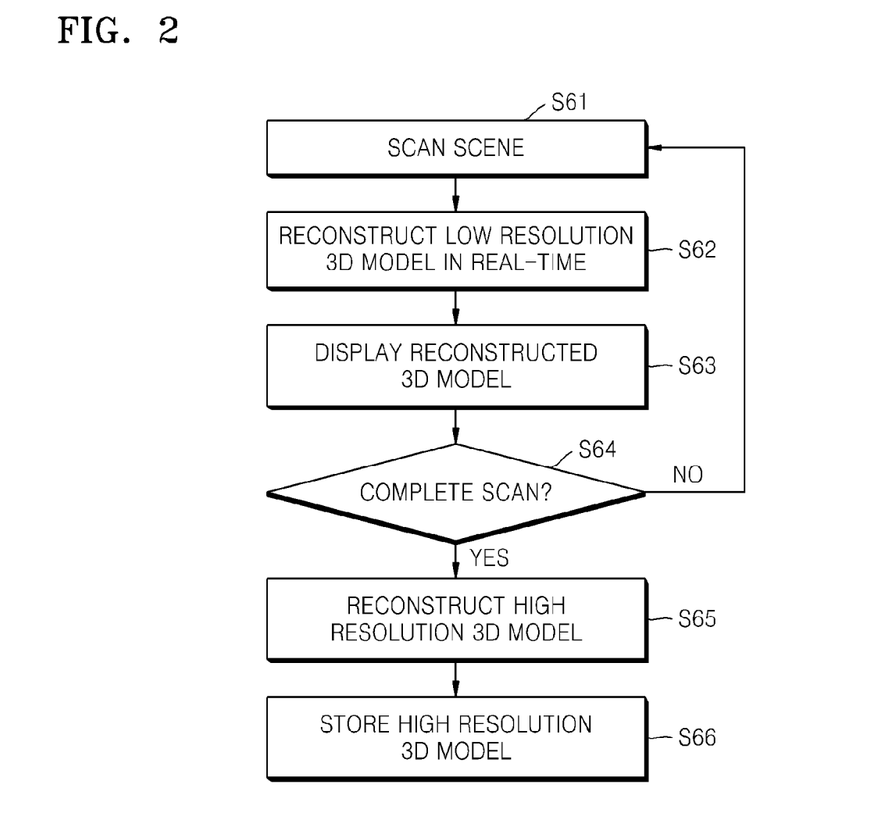
FIGS. 2 and 3 are flowcharts of methods of reconstructing a 3D model in a 3D model reconstruction system, according to various embodiments.
Figure 3:
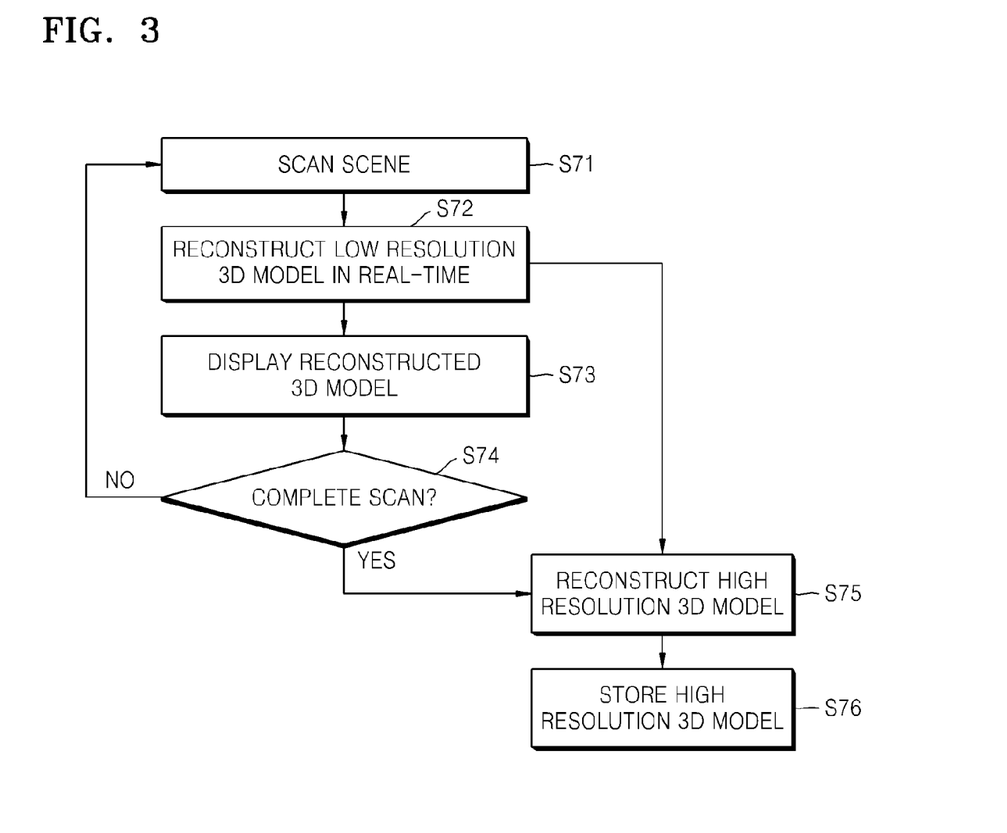

FIGS. 2 and 3 are flowcharts of methods of reconstructing a 3D model in the 3D model reconstruction system 1 of FIG. 1, according to embodiments of the present disclosure.

Referring to FIGS. 1 and 2, the depth camera 10 scans the surrounding environment or a scene in real-time (S61). The depth camera 10 generates a depth map sequence for the scanned scene at a predetermined frame rate.

The low resolution reconstruction unit 30 processes the depth map sequence received from the depth camera 10 in real-time and reconstructs a low resolution 3D model in real-time (S62).

The low resolution reconstruction unit 30 in one example reconstructs the low resolution 3D model each time the depth camera 10 performs a scan and displays the low resolution 3D model in real-time (S63). The low resolution reconstruction unit 30 may estimate 2D data from the reconstructed low resolution 3D model and display on a screen a low resolution image obtained by visualizing the estimated 2D data. The user may monitor the low resolution image displayed on the screen in real-time and complete a 3D model.

The depth camera 10 may continuously perform a scan until reconstruction of the low resolution 3D model is completed (S64). When the depth camera 10 completes a scan, the low resolution reconstruction unit 30 transmits a depth map sequence received from the depth camera 10 and pose change information of the depth camera 10 that is extracted for each depth map to the high resolution reconstruction unit 50.

The high resolution reconstruction unit 50 receives the depth map sequence and the pose change information of the depth camera 10 that is extracted for each depth map from the low resolution reconstruction unit 30 to reconstruct a high resolution 3D model (S65). Since the high resolution reconstruction unit 50 may skip processing of a depth map exhibiting little pose change, i.e., a depth map overlapping a previous depth map based on the pose change information of the depth camera 10, it is possible to reduce a range for extracting pose change information of the depth camera 10, thereby decreasing the number of computations and a computation time required to reconstruct a high resolution 3D model.

The high resolution reconstruction unit 50 stores the reconstructed high resolution 3D model in the memory (S66). The stored high resolution 3D model may be used in various application systems that use animation movies, games, or characters.

Referring to FIGS. 1 and 3, the depth camera 10 scans the surrounding environment or scene in real-time (S71). The depth camera 10 generates a depth map sequence for the scanned scene at a predetermined frame rate.

The low resolution reconstruction unit 30 processes the depth map sequence received from the depth camera 10 in real-time and reconstructs a low resolution 3D model in real-time (S72).

The low resolution reconstruction unit 30 in one example reconstructs a low resolution 3D model each time the depth camera 10 performs a scan and displays the low resolution 3D model in real-time (S73). The low resolution reconstruction unit 30 may estimate 2D data from the reconstructed low resolution 3D model and display on a screen a low resolution image obtained by visualizing the estimated 2D data. The user may monitor the low resolution image displayed on the screen in real-time and complete a 3D model.

The depth camera 10 may continuously perform a scan until reconstruction of the low resolution 3D model is completed (S74). Whenever the depth camera 10 performs a scan, the low resolution reconstruction unit 30 may transmit in real-time a depth map sequence received from the depth camera 10 and pose change information of the depth camera 10 that is extracted for each depth map to the high resolution reconstruction unit 50.

The high resolution reconstruction unit 50 receives in real-time the depth map sequence and the pose change information of the depth camera 10 that is extracted for each depth map from the low resolution reconstruction unit 30 to reconstruct a high resolution 3D model (S75). The high resolution reconstruction unit 50 may reconstruct a high resolution 3D model by using free system resources during reconstruction of the low resolution 3D model. The high resolution reconstruction unit 50 may reconstruct a 3D model in either real-time or not.

Since the high resolution reconstruction unit 50 may skip processing of a depth map exhibiting little pose change, i.e., a depth map overlapping a previous depth map based on the pose change information of the depth camera 10, it is possible to decrease a range for extracting pose change information of the depth camera 10, thereby reducing the number of computations and a computation time required to reconstruct a high resolution 3D model.

The high resolution reconstruction unit 50 stores the reconstructed high resolution 3D model in the memory (S76). The stored high resolution 3D model may be used in various application systems that use animation movies, games, or characters.

Figure 4:
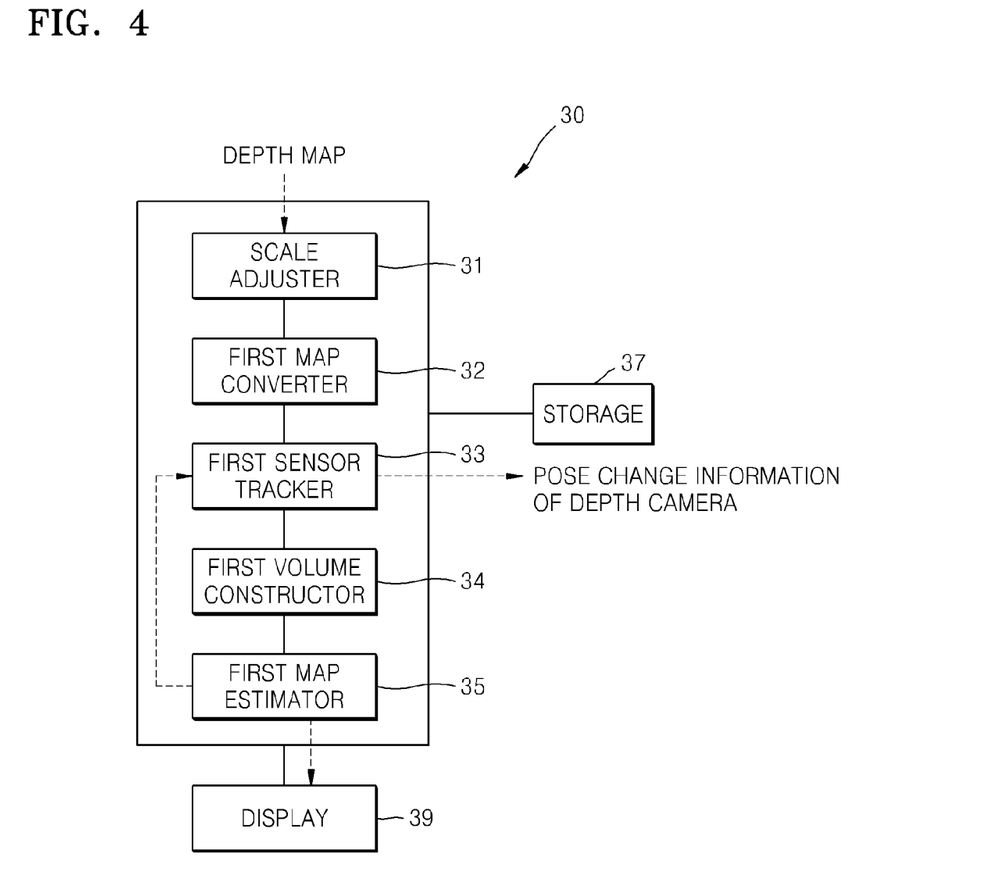
FIG. 4 is a block diagram of a low resolution reconstruction unit according to an embodiment.
Figure 5:
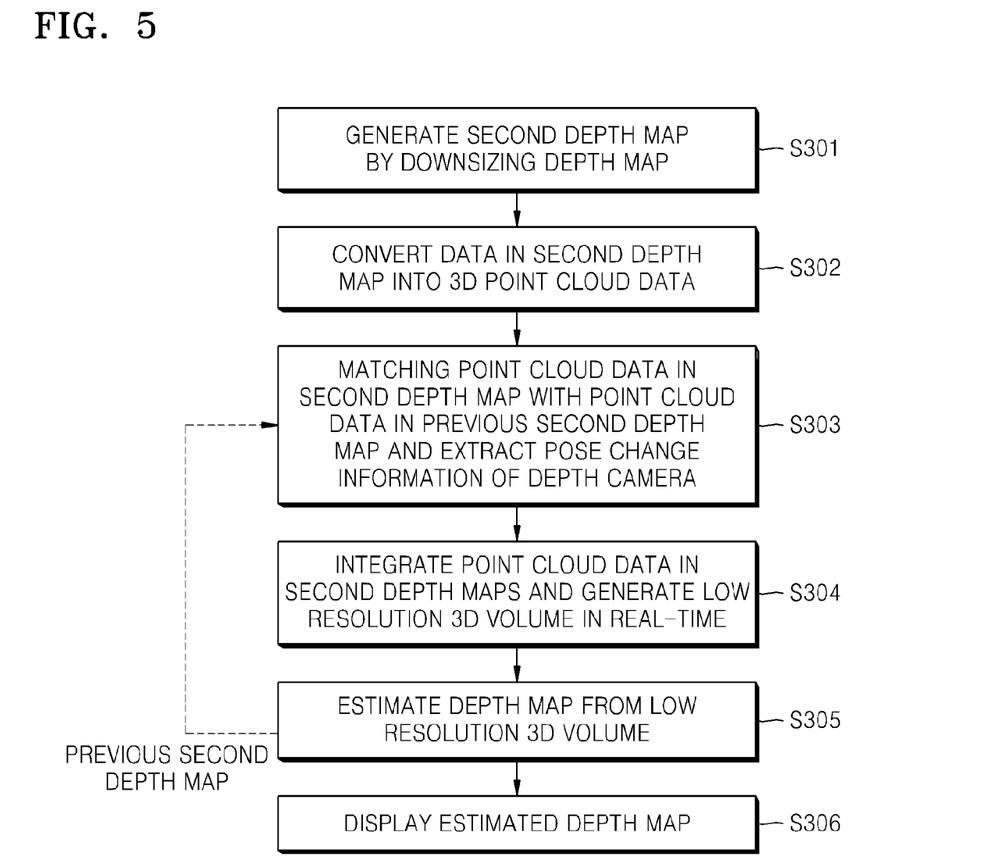
FIG. 5 is a flowchart of a method of reconstructing a 3D model in the low resolution reconstruction unit shown in FIG. 4, according to an embodiment.

FIG. 4 is a block diagram of a low resolution reconstruction unit 30 according to an embodiment, and FIG. 5 is a flowchart of a method of reconstructing a 3D model in the low resolution reconstruction unit 30 shown in FIG. 4, according to an embodiment.

Referring to FIGS. 4 and 5, the low resolution reconstruction unit 30 includes a scale adjuster 31, a first map converter 32, a first sensor tracker 33, a first volume constructor 34, and a first map estimator 35. The low resolution reconstruction unit 30 may further include a storage 37 and a display 39.

The scale adjuster 31 downsizes a depth map to generate a second depth map having a low resolution (S301). The scale adjuster 31 downscales the depth map to a size suitable for real-time monitoring to thereby reduce a resolution of the depth map. The present disclosure is not limited to a particular downscaling method, and various downscaling methods may be used.

The first map converter 32 converts depth data in the second depth map into point cloud data in a coordinate system in a 3D space (S302). The point cloud data is a set of points in the 3D coordinate system.

The first sensor tracker 33 registers (matches) point cloud data in the second depth map with point cloud data in a reference depth map by using an iterative closest (corresponding) point (ICP) algorithm and extracts pose change information of a depth camera 10 based on the result of registration (matching) (S303). The pose change information of the depth camera 10 includes position information and pose information of the depth camera 10. The position information represents a position in an arbitrary absolute coordinate system where the depth camera 10 is located, and the pose information refers to an amount by which the depth camera 10 rotates about an absolute coordinate axis. Calculation of the position information and the pose information of the depth camera 10 is repeated for each depth map generated by the depth camera 10 by using an ICP algorithm so as to track a movement of the depth camera 10 within a scene. The system and method for reconstructing a 3D model, according to the embodiments of the present disclosure, employ a low resolution depth map, thus allowing real-time tracking of movement of a depth camera 10.

An ICP algorithm is used to extract pose change information of a depth camera 10 at a point in time when the depth camera 10 completes an n-th scan. The ICP algorithm iteratively compares a point in one of a pair of depth map, i.e., a reference depth map with its closest or corresponding point in the other depth map, i.e., a newly input depth map and computes relative rigid transformation between the pair of depth maps.

A reference depth map required to extract pose change information of the depth camera 10 at the point in time when the n-th scan is completed may be a depth map acquired by a scan performed prior to the n-th scan. For example, a reference depth map for the n-th scan may be a depth map by an n−1-th scan. Alternatively, the reference depth map may be a depth map estimated from a 3D model reconstructed after completion of the n−1-th scan. Hereinafter, a reference depth map, which is a depth map that is acquired earlier than a current depth map or that is estimated from a reconstructed 3D model, is referred to as a previous depth map.

The first sensor tracker 33 applies an ICP algorithm to point cloud data in the second depth map and a previous depth map for matching therebetween. The previous depth map is a depth map (hereinafter, referred to as a 'previous second depth map') downsized to correspond to the second depth map.

The first volume constructor 34 integrates (merges) together point cloud data in sequentially input second depth maps and generates a low resolution 3D volume in real-time, based on the pose change information of the depth camera 10 (S304). The first volume constructor 34 may align and accumulate the point cloud data in the second depth maps based on the result of matching and generate a low resolution 3D volume in order to reconstruct a low resolution 3D model. In this case, the first volume constructor 34 may adjust a size of the 3D volume so as to reduce a resolution thereof.

The first map estimator 35 estimates a depth map from the low resolution 3D volume (S305). The first map estimator 35 may estimate a 2D depth map from a 3D volume by using a ray casting technique. The estimated depth map may be stored in the storage 37 as the previous second depth map and be used as a reference depth map for performing ICP on a subsequently input depth map.

The storage 37 may store a reference depth map, depth maps, and pose change information of the depth camera 10 that is extracted for each depth map. The storage 37 may be a storage medium such as a memory for temporarily storing input and output data.

The estimated depth map is visualized as 2D data based on a user's viewpoint and displayed on the display 39 (S306), thus allowing the user to monitor a real-time 3D model on a screen of the display 39.

Figure 6:
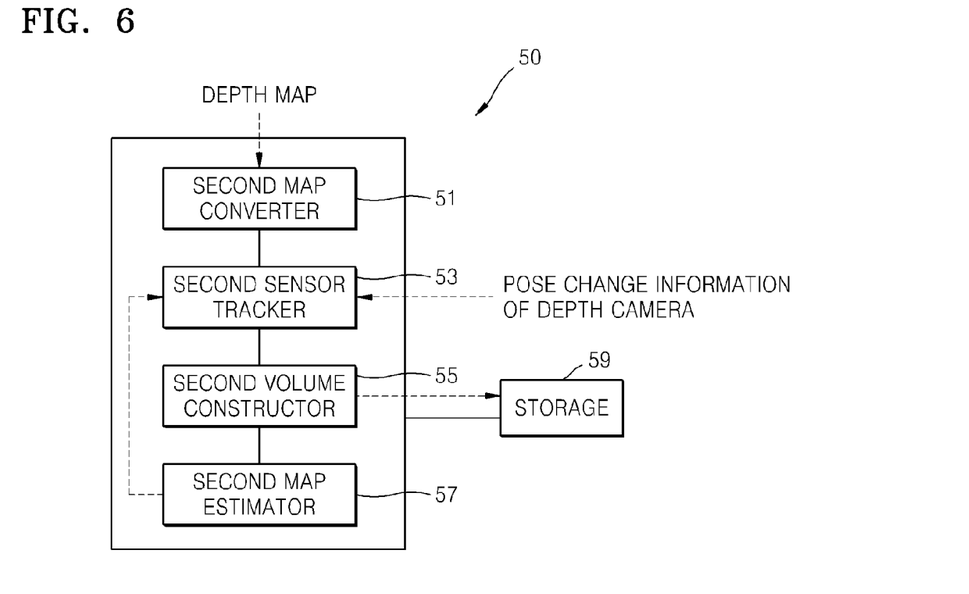
FIG. 6 is a block diagram of a high resolution reconstruction unit according to an embodiment.
Figure 7:
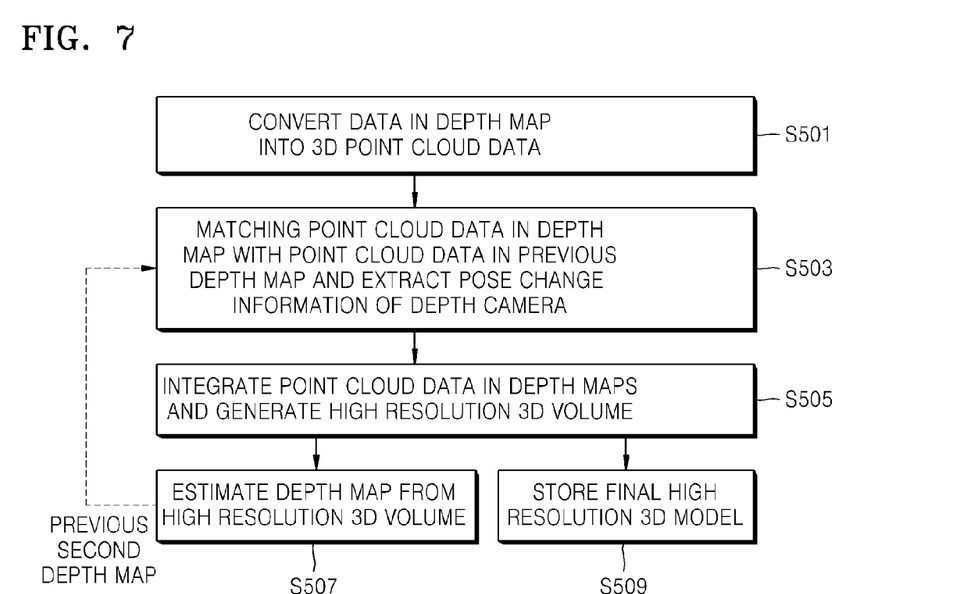
FIG. 7 is a flowchart of a method of reconstructing a 3D model in the high resolution reconstruction unit shown in FIG. 6, according to an embodiment.

FIG. 6 is a block diagram of a high resolution reconstruction unit 50 according to an embodiment, and FIG. 7 is a flowchart of a method of reconstructing a 3D model in the high resolution reconstruction unit 50 shown in FIG. 6, according to an embodiment.

Referring to FIGS. 6 and 7, the high resolution reconstruction unit 50 includes a second map converter 51, a second sensor tracker 53, a second volume constructor 55, and a second map estimator 57. The high resolution reconstruction unit 50 may further include a storage 59.

The high resolution reconstruction unit 50 is configured to reconstruct a high resolution 3D model from an original depth map without reducing a resolution of the original depth map.

The second map converter 51 converts depth data in a depth map into point cloud data in a coordinate system in a 3D space (S501). The point cloud data is a set of points in the 3D coordinate system.

The second sensor tracker 53 matches point cloud data in the depth map with point cloud data in a previous depth map by using an ICP algorithm and extracts pose change information of a depth camera 10 based on the result of matching (S503). The pose change information of the depth camera 10 includes position information and pose information of the depth camera 10.

The second sensor tracker 53 may exclude overlapping depth maps from depth maps received from the low resolution reconstruction unit (30 in FIG. 4) based on the pose change information of the depth camera 10 and perform an ICP algorithm on selected depth maps except for the overlapping depth maps. Thus, the second sensor tracker 53 does not need to extract pose change information of the depth for all the received depth maps, thereby reducing the number of computations and a computation time. The second sensor tracker 53 may also use pose change information of the depth camera 10 that is received from the low resolution reconstruction unit 30 while applying the ICP algorithm to reduce the time taken to find closest or a corresponding pair of points in a pair of depth maps, thereby decreasing the number of computations and a computation time.

Alternatively, the second map converter 51 may omit conversion of data in the overlapping depth maps, and the second sensor tracker 53 may only perform an ICP algorithm on depth maps received from the second map converter 51.

The second volume constructor 55 integrates together point cloud data in sequentially input depth maps and generates a high resolution 3D volume, based on the pose change information of the depth camera 10 (S505). The second volume constructor 55 may align and accumulate the point cloud data in the depth maps based on the result of matching and generate a high resolution 3D volume in order to reconstruct a high resolution 3D model.

The second map estimator 57 estimates a 2D depth map from the high resolution 3D volume (S507). The estimated depth map may be stored in the storage 59 as the previous depth map and be used as a reference depth map for performing ICP on a subsequently input depth map.

The storage 59 may store (S509) one or more of a reference depth map, depth maps, pose change information of the depth camera 10 that is extracted for each depth map, and a high resolution 3D model. The storage 59 may be a storage medium such as a memory for temporarily storing input and output data.

Figure 8:
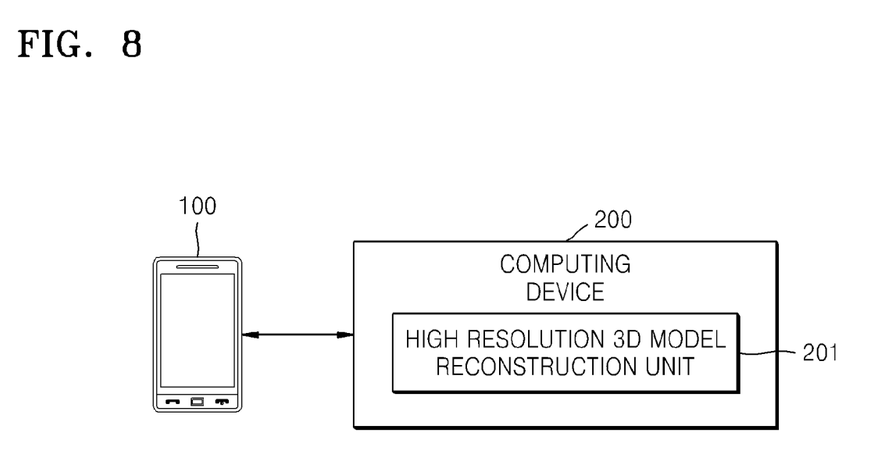
FIG. 8 is a diagram of a 3D model reconstruction system according to an embodiment.
Figure 9:
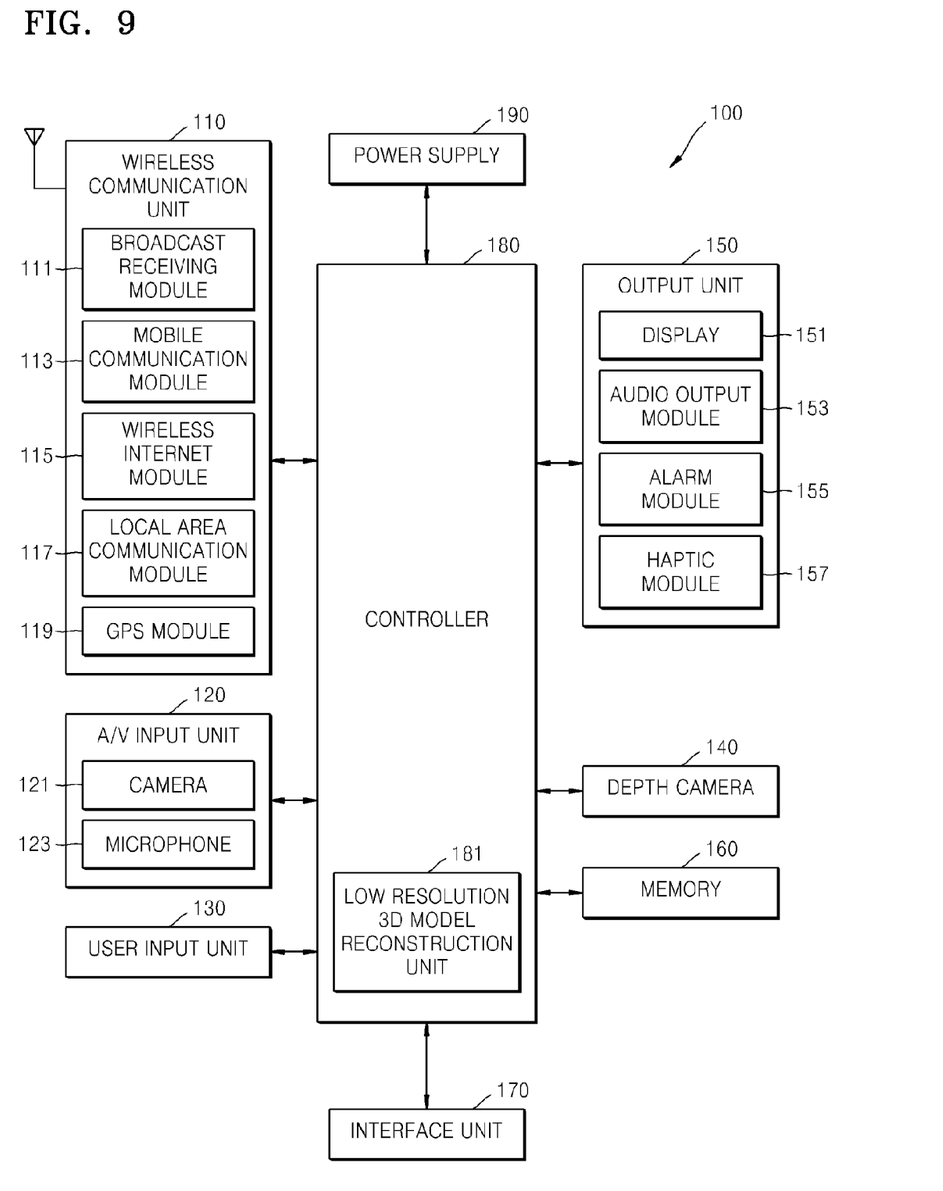
FIG. 9 is a block diagram of a configuration of a mobile terminal of FIG. 8 according to an embodiment.

FIG. 8 is a diagram of a 3D model reconstruction system according to an embodiment, and FIG. 9 is a block diagram of a configuration of a mobile terminal 100 of FIG. 8.

Referring to FIG. 8, the mobile terminal 100 may reconstruct a low resolution 3D model in real-time, and a computing device 200 may reconstruct a high resolution 3D model by using the result of reconstruction of the low resolution 3D model. The mobile terminal 100 and the computing device 200 may communicate with each other in a wired or wireless manner and exchange data therebetween.

The mobile terminal 100 may be an embedded system for reconstructing a low resolution 3D model, while the computing device 200 may be a high performance system for reconstructing a high resolution 3D model.

Referring to FIG. 9, the mobile terminal 100 may include a wireless communication unit 110, an audio/video (AN) input unit 120, a user input unit 130, a depth camera 140, an output unit 150, a memory 160, an interface unit 170, a controller 180, and a power supply 190. When the components are used in an application, two or more components may be integrated into a single component, or one component may be segmented into two or more components when necessary or as desired.

The wireless communication unit 110 may include a broadcast receiving module 111, a mobile communication module 113, a wireless Internet module 115, a local area communication module 117, and a global positioning system (GPS) module 119.

The broadcast receiving module 111 receives at least one of a broadcast signal or broadcast-related information from an external broadcast management server (not shown) via a broadcast channel. One or more of the broadcast signal or the broadcast-related information received by the broadcast receiving module 111 may be stored in the memory 160.

The mobile communication module 113 transmits or receives a wireless signal to or from at least one of a base station, an external terminal, or a server in a mobile communication network. Here, the wireless signal may include data in any one of various formats according to transmitting and receiving a voice call signal, a video call signal, or a text/multimedia message.

The wireless internet module 115 is a module for wirelessly connecting to the internet. The wireless internet module 115 may be built in or separate from the mobile terminal 100. Examples of wireless internet technologies supported by the wireless internet module 115 may include a Wireless Local Area Network (WLAN), Wireless Fidelity (Wi-Fi), Wireless Broadband (WiBro), World Interoperability for Microwave Access (WiMAX), or High Speed Downlink Packet Access (HSDPA).

The local area communication module 117 is a module for local area communication. Examples of local area communication techniques may include Bluetooth, Radio Frequency Identification (RFID), Infrared Data Association (IrDA), Ultra Wideband (UWB), and ZigBee.

The GPS module 119 may receive position information from a plurality of GPS satellites (not shown).

The NV input unit 120 may be configured to receive audio signals or video signals. The A/V input unit 120 includes a camera 121 and a microphone 123. The camera 121 processes image frames such as still images or moving images obtained by an image sensor in a video call mode or a capture mode. The processed image frames may then be displayed on a display 151.

The image frames processed by the camera 121 may be stored in the memory 160 or be transmitted to an external device through the wireless communication unit 110. The mobile terminal 100 may include two or more cameras 121 according to its implementation.

The microphone 123 may receive an external audio signal in a call or recording mode or in a voice recognition mode and convert the received audio signal into electrical audio data. In the call mode, the mobile communication module 113 may convert the electrical audio data into a format that can be transmitted to a mobile communication base station through the mobile communication module 113 for output.

The user input unit 130 generates key input data that is entered for controlling the operation of the mobile terminal 100. The user input unit 130 may include a keypad, a dome switch, a touch pad (resistive/capacitive), a scroll wheel, a scroll switch, or a finger-actuated mouse. In particular, when the user input unit 130 is a touch pad and forms a cross-layer structure with the display 151, the user input unit 130 and the display 151 may be collectively referred to as a touch screen. The mobile terminal 100 according to the present embodiment may receive a request to generate a 3D model from a user through the user input unit 130.

Upon receipt of a request for generation of a 3D model from the user, the depth camera 140 scans the surrounding environment and a scene to collect information necessary for generating a depth map. The depth camera 140 may generate a depth map sequence at a predetermined frame rate.

The output unit 150 may output an audio signal, a video signal, or an alarm signal. The output unit 150 may include one or more of the display 151, an audio output module 153, an alarm module 155, or a haptic module 157.

The display 151 may display and output information processed in the mobile terminal 100. For example, if the mobile terminal 100 is in a call mode, the display 151 may display a user interface (UI) or a graphical user interface (GUI) used in the call mode. When the mobile terminal 100 is in a video call mode or a capture mode, the display 151 may display captured or received images either individually or simultaneously as well as a UI or a GUI related to the video call mode or the capture mode. When the mobile terminal 100 is in a 3D model generation mode, the display 151 may display a low resolution 3D model reconstructed by processing in real-time a depth map received from the depth camera 140 or a 2D image in the form of a depth map estimated from the reconstructed low resolution 3D model.

If the display 151 and a touch pad as the user input unit 130 form a cross-layer structure to form a touch screen, the display 150 may be used as both an output device and an input device. If the display 151 is formed as a touch screen, the display 151 may include a touch screen panel and a touch screen panel controller.

The display 151 may include at least one of a liquid crystal display (LCD), an organic light-emitting display (OLED), an electrophoretic display (EPD), a flexible display, or a 3D display. The mobile terminal 100 may also include two or more displays 151 according to its implementation.

The audio output module 153 may output audio data received from the wireless communication unit 110 during a call reception mode, a call mode, a recording mode, a voice recognition mode, or a broadcast reception mode, or stored in the memory 160. The audio output module 153 may also output sound signals associated with functions of the mobile terminal 100, such as a call signal reception sound and a message reception sound.

The alarm module 155 may output a signal notifying the occurrence of an event in the mobile terminal 100. Examples of the event include receiving a call signal, receiving a message, and input of a key signal. The alarm module 155 may output signals other than an audio or video signal to notify the occurrence of an event. The user can recognize the occurrence of the event based on a signal output by the alarm module 155. A signal for notifying the user of the occurrence of an event may also be output by the display 151 or the audio output module 153.

The haptic module 157 generates various haptic effects that may be sensed by a user. Examples of the various haptic effects may include vibration, an effect caused by stimulation due to arrangement of pins vertically moving with regard to a surface of skin contacted, an effect caused by stimulation due to a discharge or suction of air through a discharge port or a suction port, an effect caused by a stimulus applied to the skin surface, an effect caused by stimulation due to contact with an electrode, an effect caused by stimulation using an electrostatic force, or an effect caused by reproduction of thermal sensation by using a device capable of absorbing or generating heat. The haptic module 157 may transmit haptic effects to a user through direct contact or enable the user to sense haptic effects through a muscle sense of the user's fingers or arms.

The memory 160 may store programs for processing or control operations performed by the controller 180 or temporarily store input or output data such as a phonebook, messages, still images, or moving images.

The memory 160 may include at least one storage medium such as a flash memory-type storage medium, a hard disk-type storage medium, a multimedia card micro-type storage medium, card-type memories (e.g., an SD card, an XD memory, and the like), Random Access Memory (RAM), or Read-Only Memory (ROM). The mobile terminal 100 may also access a web storage (not shown) that performs the function of the memory 160 on the Internet. The mobile terminal 100 may upload the result of reconstruction of a low resolution 3D model to the web storage and download a high resolution 3D model reconstructed by the computing device 200 from the web storage.

The interface unit 170 may serve as an interface with all external devices that are connected to the mobile terminal 100. Examples of the external devices may include a wired/wireless headset, an external battery charger, a wired/wireless data port, a memory card, a card socket such as a subscriber identification module (SIM)/user identity module (UIM) card, an audio input/output (I/O) terminal, a video I/O terminal, and earphones. The interface unit 170 may receive data or power from an external device to transmit the data or power to each component in the mobile terminal 100, or transmit data provided by each component in the mobile terminal 100 to an external device.

The controller 180 controls overall operations of the mobile terminal 100. The controller 180 may exchange a control signal with each component in the mobile terminal 100 or process data so as to control the operation of the components. For example, the controller 180 may perform control operations and processing related to a voice call, data communication, or a video call. The controller 180 may also include a low resolution 3D model reconstruction unit 181 for reconstructing a low resolution 3D model. The low resolution 3D model reconstruction unit 181 may be formed by hardware within the controller 180 or by software or circuits that are separate from the controller 180.

In order to reconstruct a low resolution 3D model, the low resolution 3D model reconstruction unit 181 downsizes a depth map received from the depth camera 140 to reduce a resolution thereof, extracts pose change information of the depth camera 140 as the result of matching depth maps by using an ICP algorithm, and accumulates the depth maps to generate a low resolution 3D volume. The low resolution 3D model reconstruction unit 181 may include components corresponding to one or more of the scale adjuster 31, the first map converter 32, the first sensor tracker 33, the first volume constructor 34, or the first map estimator 35 shown in FIG. 4 and perform operations for reconstructing a low resolution 3D model, as illustrated in FIG. 5.

The power supply 190 is controlled by the controller 180 to receive external power or internal power and supply power necessary for operations of components in the mobile terminal 100. The power supply 190 may include a rechargeable battery.

Referring back to FIG. 8, the mobile terminal 100 equipped with the depth camera 140 may freely move in a 3D space to capture a scene and reconstruct a low resolution 3D model.

The computing device 200 may include a high resolution 3D model reconstruction unit 201. The high resolution 3D model reconstruction unit 201 may be implemented by hardware, software, circuits, or a combination thereof. The high resolution 3D model reconstruction unit 201 may include one or more of the second map converter 51, the second sensor tracker 53, the second volume constructor 55, or the second map estimator 57 shown in FIG. 6 and perform operations for reconstructing a high resolution 3D model, as illustrated in FIG. 7.

To integrate depth maps and reconstruct a 3D model, it is necessary to track in real-time 3D coordinates and a scan direction of the freely moving depth camera 140 (i.e., the mobile terminal 100). To do so, real-time depth maps need to be processed. A conventional real-time tracking technique for use in a mobile terminal is based on image processing, which requires a significant number of computations. Furthermore, an embedded system such as the mobile terminal may have difficulty in processing real-time depth maps due to its small computational capacity.

According to the embodiment of the present disclosure, in order to provide real-time monitoring, the mobile terminal 100 may reconstruct a low resolution 3D model in real-time, and the computing device 200 may reconstruct a high resolution 3D model by using the result of reconstruction. The computing device 200 may receive the result of reconstruction of a low resolution 3D model to reconstruct a high resolution 3D model. And the mobile terminal 100 may receive the reconstructed high resolution 3D model from the computing device 200.

When the computing device 200 is implemented on a cloud server, the mobile terminal 100 may upload the result of reconstruction of a low resolution 3D model to the cloud server either in real-time or after completion of a scan, and the computing device 200 may reconstruct a high resolution 3D model by using the result of reconstruction of the low resolution 3D model for storage. The mobile terminal 100 may download the reconstructed high resolution 3D model from the cloud server.

Figure 10:
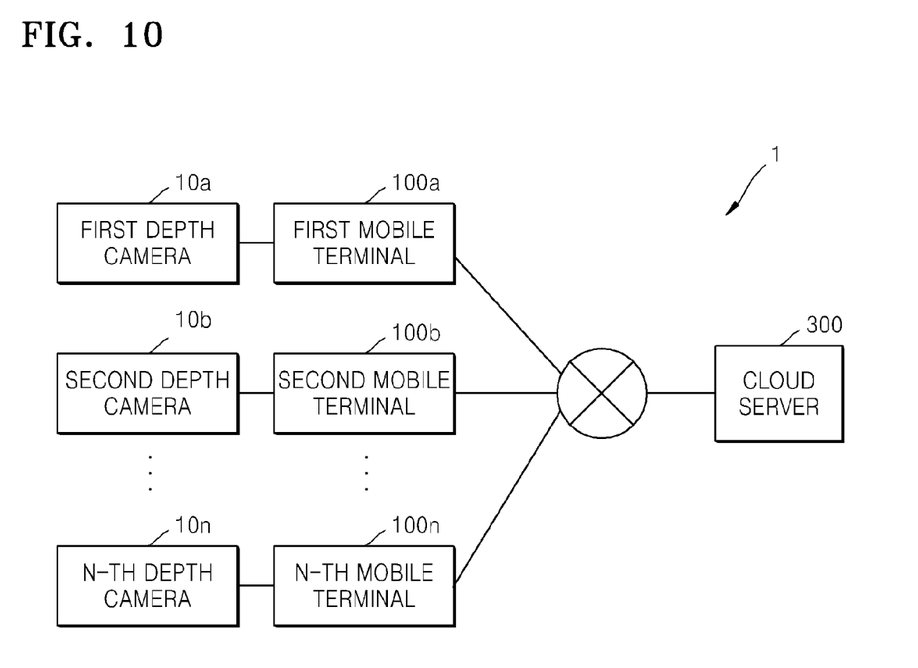
FIG. 10 illustrates a 3D model reconstruction system employing multi-scanning, according to an embodiment.

FIG. 10 illustrates a 3D model reconstruction system 1 employing multi-scanning, according to an embodiment.

Referring to FIG. 10, the 3D model reconstruction system 1 may include first through n-th depth cameras 10a, 10b, ..., and 10n, first through n-th mobile terminals 100a, 100b, ..., and 100n, and a cloud server 300. The first through n-th mobile terminals 100a, 100b, ..., and 100n communicate with the cloud server 300 via a network such as the Internet or wirelessly by using any suitable method.

Each of the first through n-th depth cameras 10a, 10b, ..., and 10n scans the same scene from different viewpoints or fields of view to generate a depth map sequence.

Each of the first through n-th mobile terminals 100a, 100b, ..., and 100n receives a depth map from a corresponding one of the first through n-th depth cameras 10a, 10b, ..., and 10n to reconstruct a low resolution 3D model.

Each of the first through n-th mobile terminals 100a, 100b, ..., and 100n uploads the received depth map and pose change information of a corresponding one of the first through n-th depth cameras 10a, 10b, ..., and 10n that is extracted during reconstruction of the low resolution 3D model to the cloud server 300. The depth map may be uploaded as a compressed or uncompressed 2D image.

The cloud server 300 reconstructs a high resolution 3D model based on the depth maps and the pose change information uploaded from the first through n-th mobile terminals 100a, 100b, ..., and 100n. The cloud server 300 converts the uploaded depth maps into a common format, reconstructs a single high resolution 3D model, and stores the reconstructed high resolution 3D model.

Each of the first through n-th mobile terminals 100a, 100b, ..., and 100n downloads the reconstructed high resolution 3D model from the cloud server 300 and merges the downloaded high resolution 3D model into its low resolution 3D model. Thus, each of the first through n-th mobile terminals 100a, 100b, . . . , and 100n may monitor in real-time a 3D model in which scenes scanned by the other mobile terminals have been reflected.

The above-described process of reconstructing a 3D model may be performed automatically by the 3D model reconstruction system 1 and includes scanning an object and processing depth map image data generated by the scanning, thus allowing automatic and fast conversion into a stereoscopic 3D model.

The method and system for reconstructing a 3D model, according to the embodiments of the present disclosure, may be used in the game industry, medical applications such as reconstruction of a 3D human body shape, various types of electronic commerce companies, manufacturers of design and major precision components, research institutes, military equipment, and the like, thereby providing user convenience.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A system for reconstructing a three-dimensional (3D) model, the system comprising:
a low resolution reconstruction unit that comprises:
a scale adjuster that converts a first depth map, acquired by scanning a scene with a depth camera, into a second depth map having a low resolution by downsizing the first depth map,
a first map converter that converts depth data in the second depth map into point cloud data in a coordinate system in 3D space,
a first sensor tracker that matches point cloud data in the second depth map with point cloud data in a previous second depth map by using an iterative closest point (ICP) algorithm and extracts pose change information about a pose change of the depth camera based on the result of matching, and
a first volume constructor that integrates together point cloud data in the second depth map and the previous second depth map and generates, a low resolution 3D model in real-time, based on the pose change information of the depth camera; and a high resolution reconstruction unit that processes the first depth map by using the pose change information of the depth camera that is extracted from the second depth map and reconstructs a high resolution 3D model.

2. The system of claim 1, wherein the low resolution reconstruction unit further comprises a first map estimator for estimating an estimated depth map from the low resolution 3D volume.

3. The system of claim 2, wherein the estimated depth map is visualized based on a user's viewpoint, displayed, and stored as the previous second depth map.

4. The system of claim 1, wherein the high resolution reconstruction unit comprises:
a second map converter that converts the depth data in the first depth map into point cloud data in a coordinate system in 3D space;
a second sensor tracker that matches point cloud data in the first depth map with point cloud data in a previous first depth map by using an iterative closest point (ICP) algorithm and extracts the pose change information of the depth camera based on the result of matching; and
a second volume constructor that integrates together point cloud data in the first depth map and the previous first depth map and generates a high resolution 3D volume, based on the pose change information of the depth camera, and
wherein the second sensor tracker performs the ICP algorithm by using the pose change information of the depth camera that is extracted from the second depth map.

5. The system of claim 4, wherein the high resolution reconstruction unit further comprises a second map estimator for estimating an estimated depth map from the high resolution 3D volume.

6. The system of claim 4, wherein the second sensor tracker excludes overlapping depth maps by using the pose change information of the depth camera that is extracted from the second depth map and performs the ICP algorithm on each of the selected depth maps except for the overlapping depth maps.

7. The system of claim 5, wherein the estimated depth map is stored as the previous first depth map.

8. The system of claim 1, wherein the high resolution reconstruction unit receives a depth map sequence and the pose change information of the depth camera from the low resolution reconstruction unit and reconstructs a high resolution 3D model, either after the depth camera completes a scan or while the depth camera performs the scan.

9. The system of claim 1, wherein the low resolution reconstruction unit is an embedded system,
wherein the high resolution reconstruction unit is a cloud server, and
wherein the embedded system uploads a depth map sequence and the pose change information of the depth camera to the cloud server and downloads the high resolution 3D model from the cloud server.

10. A method of reconstructing a three-dimensional (3D) model, the method comprising:
converting a first depth map acquired by scanning a scene through a depth camera into a second depth map having a low resolution, processing the second depth map to extract pose change information about a pose change of the depth camera, and reconstructing a low resolution 3 D model in real-time; and
processing the first depth map by using the pose change information of the depth camera that is extracted from the second depth map and reconstructing a high resolution 3D model;
wherein reconstructing the low resolution 3D model in real-time comprises:
generating the second depth map by downsizing the first depth map,
converting depth data in the second depth map into point cloud data in a coordinate system in 3D space,
matching point cloud data in the second depth map with point cloud data in a previous second depth map by using an iterative closest point (ICP) algorithm and extracting the pose change information of the depth camera based on the result of matching, and
integrating together point cloud data in the second depth map and the previous second depth map and generating a low resolution 3D volume in real-time, based on the pose change information of the depth camera.

11. The method of claim 10, wherein the reconstructing of the low resolution 3D model further comprises estimating an estimated depth map from the low resolution 3D volume.

12. The method of claim 11, wherein the estimated depth map is visualized based on a user's viewpoint, displayed, and stored as the previous second depth map.

13. The method of claim 10, wherein the reconstructing of the high resolution 3D model comprises:
converting the depth data in the first depth map into point cloud data in a coordinate system in 3D space;
matching point cloud data in the first depth map with point cloud data in a previous depth map by using an ICP algorithm and extracting the pose change information of the depth camera based on the result of matching; and
integrating together point cloud data in the first depth map and the previous first depth map and generating a high resolution 3D volume, based on the pose change information of the depth camera, and
wherein in the extracting of the pose change information of the depth camera, the ICP algorithm is performed by using the pose change information of the depth camera that is extracted from the second depth map.

14. The method of claim 13, wherein the reconstructing of the high resolution 3D model further comprises estimating an estimated depth map from the high resolution 3D volume.

15. The method of claim 13, wherein the extracting of the pose change information of the depth camera comprises excluding overlapping depth maps by using the pose change information of the depth camera that is extracted from the second depth map and performing the ICP algorithm on each of the selected depth maps except for the overlapping depth maps.

16. The method of claim 14, wherein the estimated depth map is stored as the previous first depth map.

17. The method of claim 10, wherein the reconstructing of the high resolution 3D model comprises reconstructing the high resolution 3D model by using a depth map sequence and the pose change information of the depth camera, either after the depth camera completes a scan or while the depth camera performs the scan.

18. The method of claim 10, wherein the reconstructing of the low resolution 3D model comprises reconstructing the low resolution 3D model in each of a plurality of embedded systems, and wherein the reconstructing of the high resolution 3D model comprises reconstructing the high resolution 3D model for the scene by using the pose change information of the depth camera that is received from the embedded system by a cloud server, the method further comprising:
  downloading the high resolution 3D model from the cloud server at each of the embedded systems.

\* \* \* \* \*